United States Patent
Talati (10) Patent No.: US 6,763,402 B2
(45) Date of Patent: Jul. 13, 2004

(54) DATA STORAGE SUBSYSTEM

(75) Inventor: Atul Navinchandra Talati, Foothill Ranch, CA (US)

(73) Assignee: BNL Technologies, Inc., Torrance, CA (US)

( * ) Notice: Subject to any disclaimer, the term of this patent is extended or adjusted under 35 U.S.C. 154(b) by 309 days.

(21) Appl. No.: 09/864,899

(22) Filed: May 24, 2001

(65) Prior Publication Data

US 2002/0059487 A1 May 16, 2002

Related U.S. Application Data

(60) Provisional application No. 60/207,116, filed on May 25, 2000.

(51) Int. Cl.[7] .............................................. G06F 13/14
(52) U.S. Cl. ............................. 710/36; 710/5; 710/40; 710/74; 711/114; 711/130; 711/161; 711/162
(58) Field of Search .............................. 710/5, 36, 40, 710/74; 711/114, 130, 161, 162

(56) References Cited

U.S. PATENT DOCUMENTS 5,623,672 A    4/1997  Popat
5,831,985 A  * 11/1998  Sandorfi ..................... 370/468
6,157,963 A  * 12/2000  Courtright ..................... 710/5
6,542,961 B1 *  4/2003  Matsunami et al. ........ 711/114
6,701,411 B2 *  3/2004  Matsunami et al. ........ 711/114

OTHER PUBLICATIONS

"P1394a Draft Standard for a High Performance Serial Bus (Supplement)", P1394a Draft 3.0, Jun. 30, 1999, IEEE Computer Society.

* cited by examiner

Primary Examiner—A. Elamin
(74) Attorney, Agent, or Firm—Gregory L. Roth (57) ABSTRACT

A data storage system includes one or more data storage devices, one or more bridges that are each coupled to a different associated data storage device and a bus interface that is connectable to up to four host data processors through an IEEE 1394a type of serial bus. Each bridge operates as an interface for the associated data storage device and allows each of the up to four hosts to log in to the associated data storage device simultaneously. Conflicting accesses to the associated storage device of a bridge are queued and processed by the bridge in the order they are received. In the preferred embodiment the data storage devices are ATA/ATAPI type hard disk drives.

41 Claims, 7 Drawing Sheets

| | |
|---|---|
| PASSWORD | |
| PASSWORD | |
| LOGIN RESPONSE | |
| LOGIN RESPONSE | |
| N \| rq_fmt \| x (0) \| RESERVED | FUNCTION (0) \| LUN |
| PASSWORD LENGTH (0) | LOGIN RESPONSE LENGTH |
| STATUS FIFO | |
| STATUS FIFO | |

LOGIN ORB 212

DATA STORAGE SUBSYSTEM

This application claims the benefit of Provisional application No. 60/207,116 filed May 25, 2000.

BACKGROUND OF THE INVENTION

Desk top and notebook personal computers have become quite powerful in recent years, thus enabling the accomplishment of sophisticated tasks. Such computers typically include one or two hard disk drives for storage of programs and large data files. Such disk drives are typically available with present data storage capacities in the range of 2–30 gigabytes. While such capacities are adequate for many applications, there exists applications involving tasks such as very large data bases, video processing and graphics processing where even larger data storage capacity is desirable, and sometimes essential.

As a result of the consumer demand for such high capacity data storage, data storage systems have been developed that contain one, or typically several, hard disk drives. Such data storage systems may be connected to a computer to greatly increase the data storage capacity that is available to the computer. While such data storage systems solve the capacity problem, they have a disadvantage in that only one computer can access the stored data at one time. In many applications, more than one computer user would like to have simultaneous access to the same data, but this cannot be accommodated with present data storage systems.

SUMMARY OF THE INVENTION

A data storage system in accordance with the invention includes an interface that is connectable via a data bus system to a plurality of host data processing systems, at least one data storage device, and at least one bridge, each bridge being coupled to an associated one of the at least one data storage device and to the interface, each bridge establishing login connections with a plurality of the host data processing systems and simultaneously maintaining login connections with a plurality of the host data processing systems, and each bridge making data accesses to the associated data storage device in response to access request information received from a plurality of host data processing systems.

In a preferred embodiment, the data storage system is connectable to up to four Macintosh personal computers over a packet switched FireWire IEEE P 1394a standard protocol hot pluggable serial bus to form a storage area network. The data storage system includes up to 6 data storage devices, which are each implemented as an ATA/ATAPI hard drive having at present a capacity up to about 45 gigabytes. The data storage system includes a network of data bus hubs that provide selectable connection over the serial data bus between each computer and up to 6 ATA to serial bus bridges. Each bridge connects to a different data storage device and provides required protocol conversions between the communication protocols used by the data storage devices and the communication protocols used on the serial bus.

The serial bus performs a bus reset in response to each change in status of a node or device connected to the bus and at such other times that might be commanded by a bus component. Each bridge responds to a bus reset by logging in any host data processing systems that request a login to the data storage system up to a selected maximum of 4 hosts. The selected maximum could of course vary without departing from the invention. Once a host has logged into one of the bridges, the host has read and write access to the data storage device that is connected to the bridge.

In the preferred embodiment, the data storage devices are initialized by assigning volume names or identifiers to different portions of the storage capacity. A given portion of the storage capacity can be assigned to only one volume, but the volume assigned to a given volume name can otherwise be selected with virtually no restriction. A volume can extend across multiple data storage devices. Each volume appears logically to the host data processing systems to be a different disk drive. In typical configurations, either all of the data storage devices in the data storage system are assigned to a single volume or each data storage device is assigned a different volume designator, however, the volume assignments need not be so restricted.

When logging in, each requesting host data processing system logs in to a specific volume of the data storage capacity. The bridges that are associated with that volume thereafter retain a record of the log in that identifies the logged in host and the host thereafter has access to the selected volume, even if another host is simultaneously logged in to the same volume. Two or more hosts can therefore have simultaneous concurrent access to the same volume. Because neither the serial bus nor the physical interfaces to the disk drive data storage devices permit true simultaneous accesses, any access request that is received while a data storage device is busy responding to a prior access is placed in a FIFO queue and responded to in order.

To prevent the chaos that might occur in application programs if multiple hosts were performing concurrent write operations to the same file, it is desirable that a protocol be implemented among the host computers that precludes simultaneous login to the same volume with "write" privileges. However, the data storage system will accept concurrent overlapping write requests to the same volume from multiple logged in hosts if such write requests are received. There is normally no problem if multiple hosts implement multiple concurrent read accesses to the same volume.

BRIEF DESCRIPTION OF THE DRAWINGS

A better understanding of the invention may be had from a consideration of the following drawings, taken in conjunction with the accompanying Detailed Description, in which.

DETAILED DESCRIPTION

Figure 1:
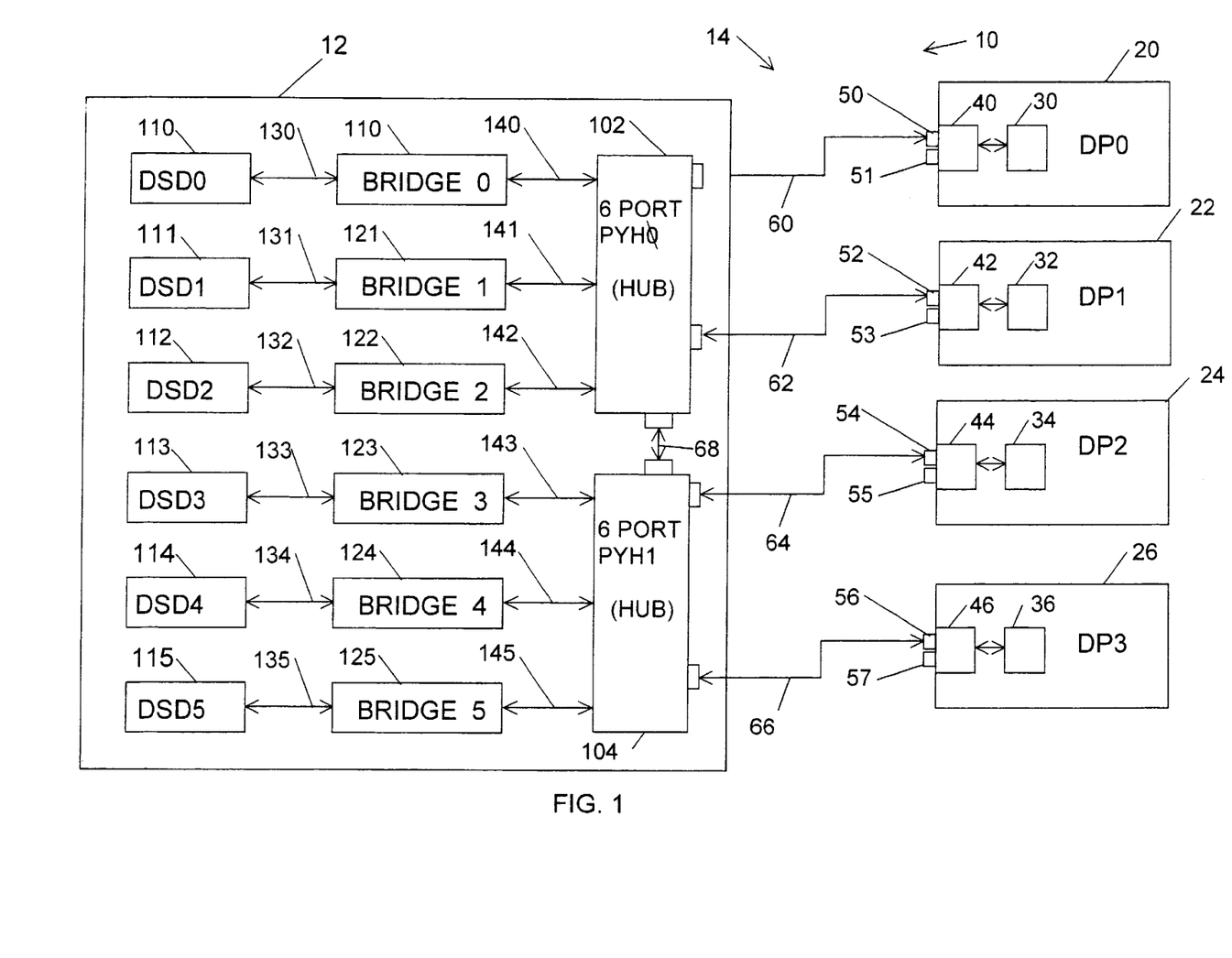
FIG. 1 is a block diagram and schematic representation of a data processing system having a data storage system in accordance with the invention.

Referring now to FIG. 1, a data processing system 10 is connected to form a storage area network and includes a data storage system 12 that is connected by a serial bus system 14 to four host data processing systems DP 0-3 20, 22, 24 and 26. The bus system 14 includes 4 cables 30, 32, 34 and 36, each coupling one of the host data processing systems 20, 22, 24, 26, respectively, to the data storage system 12.

In the present example, each host data processing system is implemented in the form a Macintosh (TM) computer manufactured by Apple Computer, Inc. However, in general, the host data processors may be personal computers or any other data processing systems having a requirement for access to large data storage and proper interface connection to bus system 14.

In the present example, the host data processing systems 20–26 communicate with the data storage system 12 using an SBP-2 protocol that has been established for SCSI drive connections. Each host data processing system 20–26 through a link layer controller 30, 32, 34, 36 that is connected for communication with a physical layer controller 40, 42, 44, 46, which is commonly referred to as a PHY. Each PHY 40–46 has two communication ports which connect to communication cables through plug connectors 50, 51, 52, 53, 54, 55, 56 and 57. The PHY and link layer controllers 30–36 and 40–46 are typically considered part of the bus system 14, although they are physically implemented within the housings of the host data processing systems 20–26.

Each PHY 40–46 provides 2 plug connectors 50, 51; 52, 53; 54, 55; and 56, 57 with one connector 50, 52, 54, 56 being pluggably connected through a cable 60, 62, 64, 66 of bus system 14 to the data storage subsystem 12. The remaining plug connectors 51, 53, 55, 57 may be connected to additional cables that in turn provide connection to other devices or nodes on the bus system 14, but are shown unconnected in the present example.

The bus system 14 is a hot pluggable (devices can be plugged into and unplugged from the bus without shutting down the bus or attached nodes) packet based serial bus system which is implemented as an IEEE P1394a serial bus system in the present example. In the environment of Macintosh (TM) computers this bus system is commonly known as a FireWire (TM) serial bus system. The bus system 14 is described in a standards publication, "P1394a, Draft Standard for a High Performance Serial Bus (Supplement)," P1394a Draft 3.0, Jun. 30, 1999 by Microprocessor and Microcomputer Standards Committee of the IEEE Computer Society, a copy of which is included as part of the application for this patent. It will be appreciated by those skilled in the art that while the bus system 14 is implemented as an IEEE P1394a serial bus system, alternative bus systems could be employed by those skilled in the art by suitably changing bus interface connections and protocols at connected nodes.

The data storage system 12 includes two 6 port PHY controllers designated PHY 0 102 and PHY 1 104, 6 data storage devices 110–115 designated DSD0–DSD5 and 6 bridges 120–125 designated bridge 0-bridge 5. Each bridge 120–125 is coupled for communication with a different associated data storage device 110–115 by a different data storage bus 130–135 and is coupled for communication with one of the PHY controllers 102, 104. Bridges 120–122 are coupled for communication with PHY controller 102 through data bus cables and bridges 123–125 are couple for communication with PHY controller 104. PHY controller 102 is also connected to host data processing systems 20, 22 through bus cables 60, 62 while PHY controller 104 is also connected to host data processing systems 24, 26 through bus cables 64, 66. Phy controllers 102 and 104 are connected to each other through bus cable.

The 6 port PHYs 102, 104 are substantially identical and are available in single integrated circuit chip implementations as IEEE 1394a Six-Port Cable Transceiver/Arbiter (September 1999) model number TSB41LV06A from Texas Instruments Incorporated. The 6 port PHYs 102, 104 are described in a product manual that is available from Tesax Instruments Incorporated entitled TSB41LV06A IEEE 1394a Six-Port Cable Transceiver/Arbiter, SLLS363-September 1999. Although the 6 port PHYs 102, 104 are physically part of the data storage system 12 and are implemented within the housing of the data storage system 12, they are logically part of the serial bus system 14. The two 6 prot PHYs 102, 104 provide PHY layer protocol connection of each host data processing system 20–26 to each of the bridges 120–125.

In the present, preferred example, the data storage devices 110–115 are implemented as ATA/ATAPI hard disk drives. Such disk drives are available from International Business Machines Corporation with a data storage capacity of approximately 34 gigabytes. Increases in capacity to 45 and 75 gigabytes are expected in the near future and even larger data storage capacities are anticipated in future years. It will be appreciated that with proper interface connections one or more of the data storage devices 110–115 could be implemented with alternative high capacity storage media, such a compact disk (CD) drive, a digital versatile disk (DVD) or data storage media.

Figure 2:
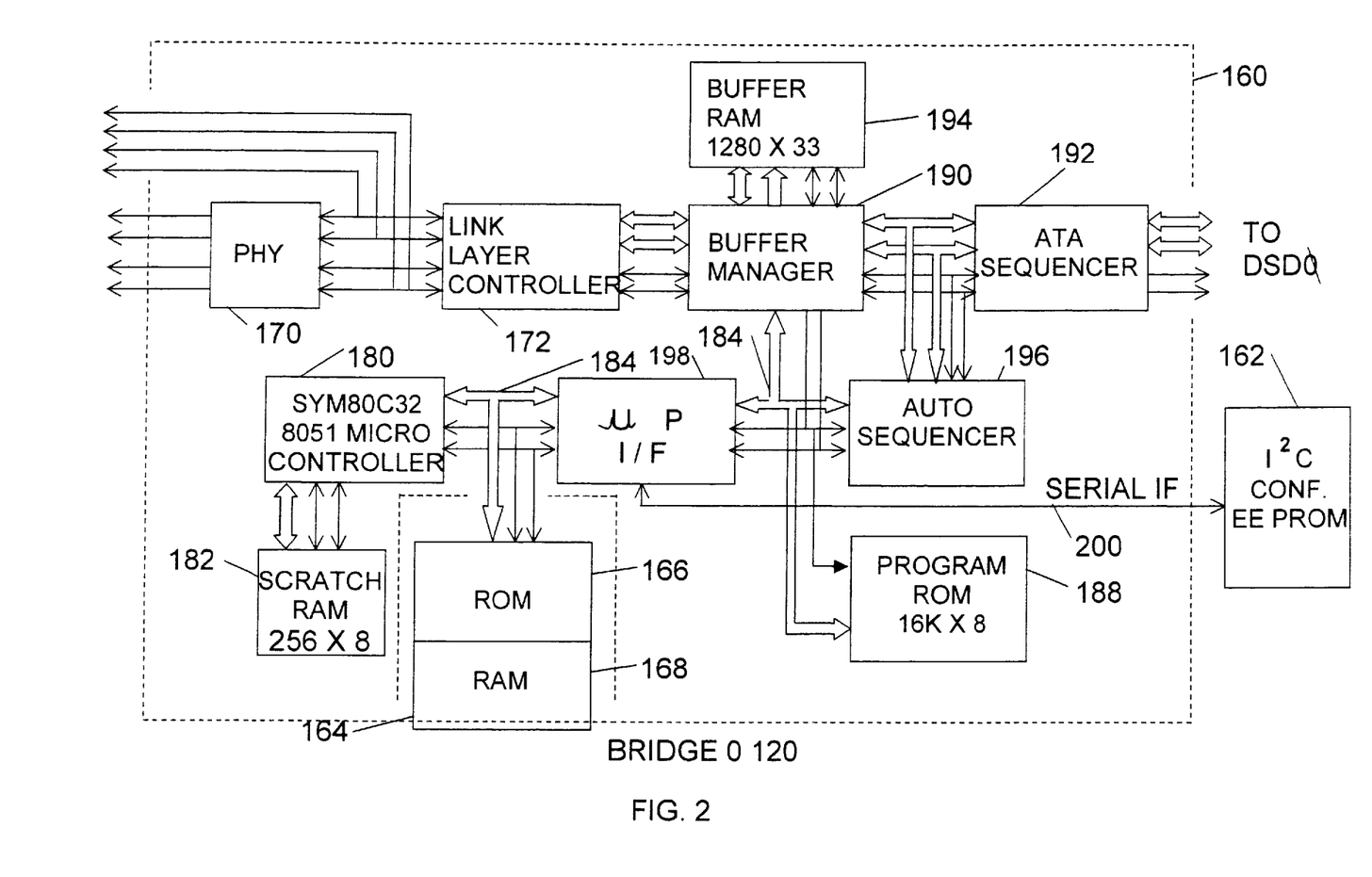
FIG. 2 is a block diagram representation of an ATA to serial bus bridge that is used in the data storage system shown in FIG. 1.

Referring now to FIG. 2, bridge 0 120 is shown as being representative of bridges 120–125. Bridge 0 120 includes a single integrated circuit chip bridge interface controller 160, an 12C configuration ROM 162 implemented as an IEEPROM, and memory 164 including ROM 166 storing program instructions and RAM 168. The bridge interface controller 160 is available from LSI Logic Corporation as SYM13FW500 ATA/ATAPI to 1394 Native Bridge and is described in Data Manual Version 1.02, Document DB14-000048-00 (October 1998). Configuration ROM 162 implements the standard configuration ROM for the data storage system 12 node of serial bus 14 and further stores similar information for the attached disk drive. ROM 166 stores program instructions that are used by a micro controller on the bridge chip 160 while RAM 168 provides additional alterable storage for the micro controller.

The bridge chip 160 implements a connection to the serial bus 14 by providing a PHY layer protocol controller 170 and a link layer protocol controller 172. While physically implemented on the chip 160, these two elements are logically part of the bus system 14 and implement communication between the remaining, transactional portion of chip 160 and the serial bus system 14. PHY controller 170 connects through cable 140 (which) is actually implemented as an impedance matched trace on a single printed circuit board) to one of the six PHY ports of PHY 102. Similarly, the corresponding PHY port of each bridge 121–126 is connected to a PHY port of one of the two 6 port PHY hubs 102, 104. The PHY hubs 102, 104 broadcast bus data received at any one port to all of the other ports to assure communication of a received packet to the proper destination node.

Bridge chip 160 includes a SYM80C32 micro controller 180 which is implemented as an 8051 standard core micro controller. Micro controller 180 is coupled to an internal 256×8 scratch RAM 182 and by a bus 184 to 48 k×8 external ROM 166, external 64 k×8 RAM 168, and 16 k×8 internal ROM 188. Scratch RAM 182 occupies addresses 0-FF hex with addresses 0-1F hex storing register data, addresses 20-7F hex and 80-DF hex providing general data storage and addresses E0-FF hex providing a stack for processor 180. External RAM 168 has a configuration of 64 k×8 and occupies addresses 0-FFFF hex in an address space that is distinguishable by micro controller 180 from the address space of scratch RAM 182. Configuration ROM 162 occupies a still further distinguishable address space of micro controller 180 with ROM 162 having a configuration of 16 k×8 and occupying addresses 0-3FFF hex and external ROM 166 having a configuration of 48 k×8 and occupying addresses 4000-FFFF hex. ROM 166 is effectively an extension of internal ROM 188 that provides for storage of an increased number of program instructions.

Buffer RAM 194 is not directly addressable by micro controller 180, but is indirectly addressable through buffer manager 190. A bank 0 or page 0 containing 512 quadlets (4 bytes) is available to micro controller 180 as 2k bytes at addresses F000-F7FF hex while a bank 1 or page 1 of data containing 512 quadlets is accessesable by micro controller 180 as 2k bytes, also at addresses F000-F7FF hex. The first 256 bytes of bank 0 store data for a FIFO receive buffer, the second 256 bytes store data for a FIFO transmit buffer and the next 512 bytes store data for a special segment buffer. A block of 128 bytes provides storage for internal registers at addresses F800-F88F hex.

A buffer manager 190 is coupled between link layer controller 172 and ATA sequencer 192. ATA sequencer provides low level protocol conversions tG between the SBP-2 protocol used for bus system communications and the ATA/ATAPI protocols used for the connection to data storage device (ATA hard disk drive) 110. Buffer manager 190 provides connection to a 1280×33 Buffer RAM 194 and micro controller bus 184 and manages the receipt, buffer storage and transmission of data blocks with link layer protocol controller 172 and ATA sequencer 192. The bridge 0 120 accepts 1394 native storage device commands using the standard SBP-2 transport protocol and translates the commands to ATA/ATAPI commands, thus making the data storage device 110 appear as a native 1394 device to bus 14 and the host data processing systems 20–26. The bridge 160 can be programmed to support all ATA/ATAPI modes, including PIO modes (0–4), DMA modes (0–2) and ultra DMA modes (0–2). Through puts can be processed with speeds of 50–400 Mbps.

An auto sequencer 196 assumes some of the load of micro controller 180 by providing low level control of communication functions between the buffer manager 190 and ATA sequencer 192. A micro processor interface is coupled for communication with micro controller 180 over bus 184 and implements a serial bus connection 200 with configuration ROM 162. Buffer RAM 194 does not appear in the direct address space of micro controller 180, but the contents are accessible through buffer manager 190.

The bridge 0 120 accepts 1394 native storage device commands using the standard SBP-2 transport protocol and translates the commands to ATA/ATAPI commands, thus making the data storage device 110 appear as a native 1394 device to bus 14 and the host data processing systems 20–26. The bridge 160 can be programmed to support all ATA/ATAPI modes, including PIO modes (0–4), DMA modes (0–2) and ultra DMA modes (0–2). Through puts can be processed with speeds of 50–400 Mbps.

Data transfers occur most significant part first, least significant part last and register bits are numbered starting with 0 for the least significant bit.

The integrated PHY and link protocol layers of the bus system 14 are managed for the bridge 120 by the PHY layer controller 170 and the link layer controller 172. The auto sequencer assists in the firmware tasks of sending transmit data and fetching ORB (operation request block) lists. The ATA sequencer manages the ATA interface and also generates and processes serial bus transactions of the data phase of a data transfer that is requested by an ORB.

PHY 170 contains a standard IEEE 1394a PHY/Link interface, which provides communication with the internal link layer controller 172. The link layer controller 172 provides a protocol engine for communicating with PHY module 170. The buffer manager 190 provides an interface to the buffer RAM for the link controller 172, auto sequencer 190, ATA sequencer 192, and micro controller interface 198. Auto sequencer 196 provides quick access into transmit and receive FIFO's stored by buffer RAM 194.

Communication occurs over the 1394 bus when a device or node connected to the bus arbitrates for access to the bus and performs reads and writes to specified addresses of other nodes on the bus. The address is a 64 bit value of which the most significant 16 bits are a node ID. A unique node ID is assigned to each device that is connected to the bus system 14 whenever a bus reset occurs. The remaining 48 bits are typically an offset into the device address space, which in the case of bridge 160, would be the lowest address in configuration ROM 162.

Serial bus system 14 is essentially a write only bus. A read access is therefore implemented as a split transaction consisting of a read request followed by a response. A write transaction is similar except that the write data is sent with the write request and the response is an acknowledgment that the write has or has not been properly accomplished.

The link controller 172 provides the protocol engine that communicates with the PHY controller 170. It transmits and receives correctly formatted IEEE 1394 serial bus packets, generates and checks 32 bit CRC (cyclic redundancy check) data, interfaces to IEEE 1394PHY modules at speeds of 400, 200, or 100 Mbps, and contains an integrated timer. Link controller 172 is partitioned into three main sections: transmitter, receiver and cycle timer. Each of these sections can be enabled separately with both the transmitter and receiver having separate resets as well. The main interface to both the transmit and receive sections is done through the transmit and receive FIFOs in the buffer RAM 194.

Figure 3:
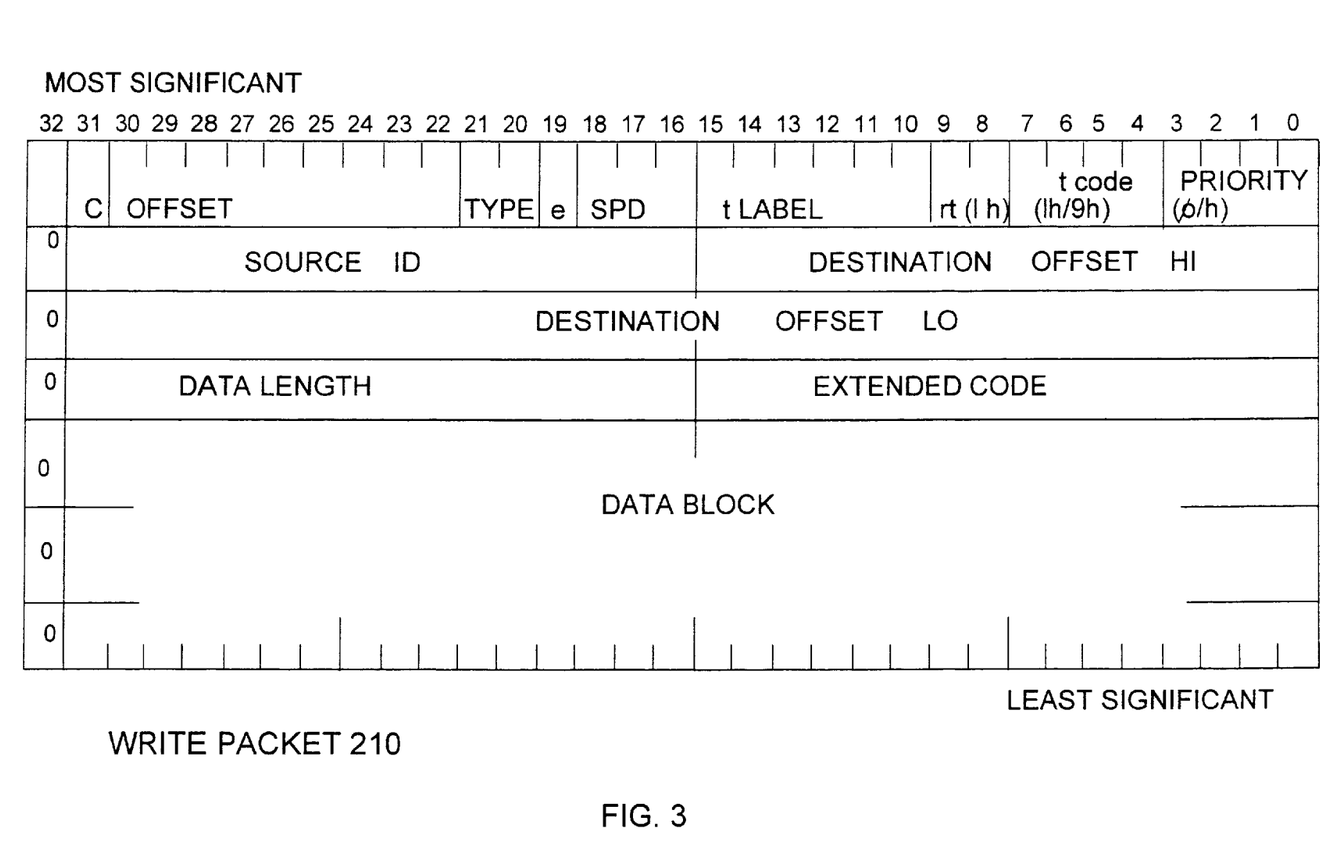
FIG. 3 is an illustration of a write packet used by the data storage system shown in FIG. 1.

Most communication transactions over bus system 14 are in the form of a write transaction using a write packet 210 as illustrated in FIG. 3, to which reference is now made. Each quadlet transmitted in a write packet 210 has an extra bit, most significant bit 32. This bit is set to 1 in the first quadlet and to 0 in the remaining quadlet. A read packet is distinguished by having bit 32 of both the first and last quadlet set to 0. The first quadlet of standard write packet 210 contains information used to identify the format of the remainder of the packet. The tCode field indicates the type of transaction and the spd field indicates the transmission speed used by the host. Bit e is the transaction enable bit. After a bus reset the receive FIFO is flushed until a packet with the e bit set rises to the top of the FIFO. When sending block data packets, the block data can come from several different sources, bank 0, bank 1 or the special segment of the buffer RAM 194. The data length field specifies the size of this data or the size of a block header that immediately follows the packet header in the FIFO buffer. The c bit or Complete_enable bit at position 31 of the first quad is used by the bridge 120 to generate the correct interrupt when the packet is received. An ACKRcv is generated if the packet was acknowledged with an ACK_complete rather than an ACK_pending. This interrupt allows the micro contoller 180 to deallocate memory associated with the write request. All of the remaining fields represent the data sent with the packet.

Figure 4:
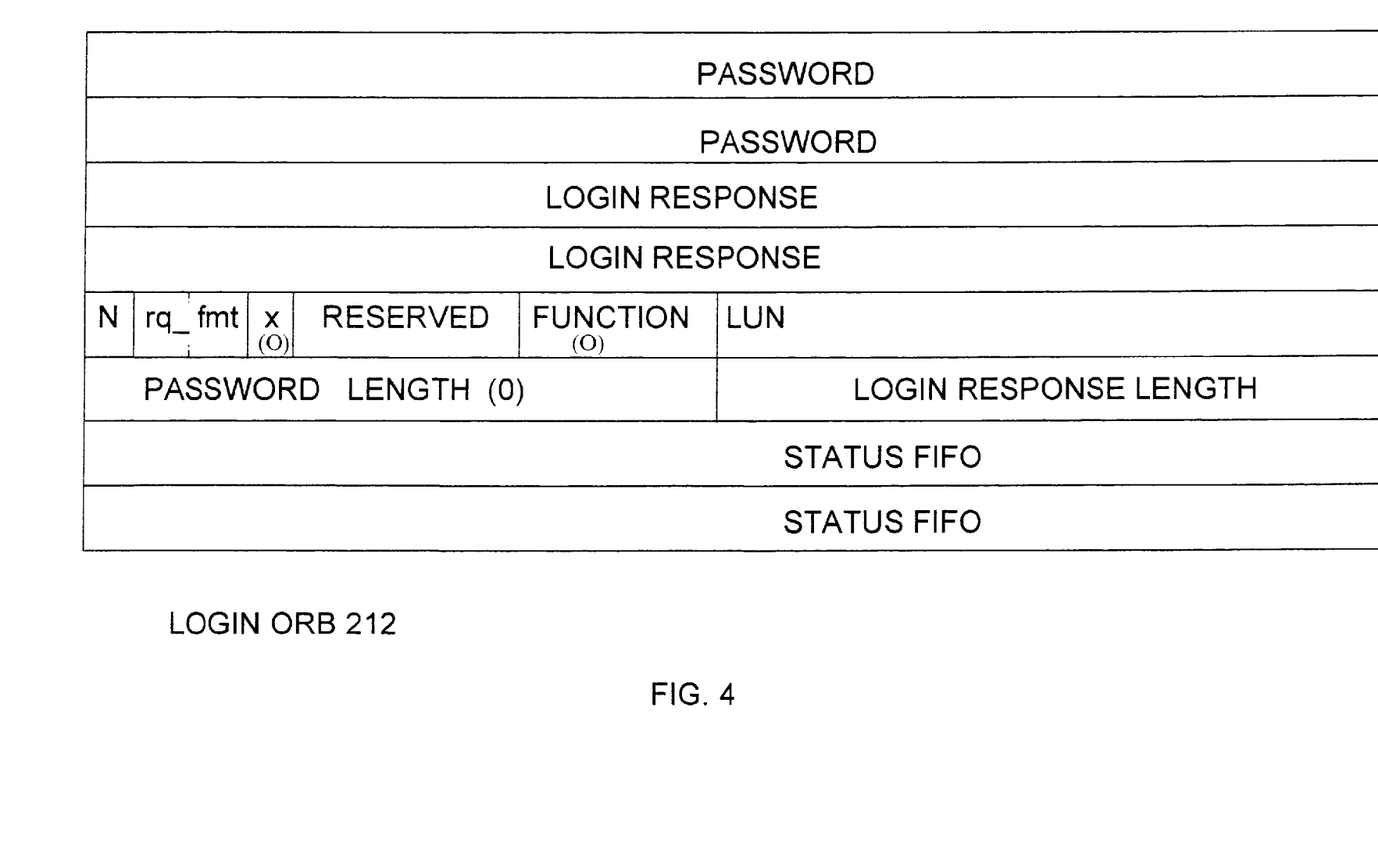
FIG. 4 is an illustration of a login request ORB used by the data storage system shown in FIG. 1.

Referring now to FIG. 4, a log in ORB 212 is communicated from a requesting host computer to bridge 12 within the 32 bit wide data block field of a write packet 210 as shown in FIG. 3. The 8 byte password field contains either 8 bytes of immediate password data or the address of a password buffer storing the password. If the password length field is zero, the password field contains the actual password. All passwords are padded to 28 bytes with the space character (20 hex) prior to comparison. The exclusive or "x" bit is not used since multiple hosts are permitted to log in to a single logical unit or LUN.

Validation of the ORB involves verifying that the password length field is 0 and that the LUN field is 0, 1, 3, or 4 (corresponding to host, not data storage device, 0, 1, 2, or 3). The bridge 120 also reads the requesting hosts unique ID, EUI-64, from the hosts bus information block by means of two quadlet read requests. The bus information block starts at offset FFF_F000_040C hex. The source ID from the write request packet (FIG. 3) is used to signal the existence of the login ORB to the bridge 120. The bridge's MANAGEMENT_AGENT register is used as the destination ID in the quadlet read requests. The bridge 120 verifies that the total number of hosts logged in will not exceed 4 (this number could be increased or decreased by a skilled artisan) and verifies that the password field of the log in ORB matches the password of the selected data storage device 110.

After the bridge 120 verifies the log in request it performs a block write to the login_response address of the log in request ORB 212. The first quad of the log in response contains a length in the most significant 16 bits that is always set to 12 and the least significant 16 bits store a log in ID which is the bus address of the requesting host. The source_ID from the write request packet 210 is used to signal presence of the log in ORB to the MANAGEMENT_AGENT register of bridge 120. It is also used as the destination_ID for both the status_FIFO buffer and the login_response addresses. The log in response includes a command_block_agent field. This field specifies the bridge agent base address that is used by the host to signal any sebsequent login_ID requests to the bridge 120. For a successful log in the command_block_agent field is:

FFFF_F001_0000 hex for host 0
FFFF_F002_0000 hex for host 1
FFFF_F004_0000 hex for host 2
FFFF_F005_0000 hex for host 3

The login_ID field is correspondingly 0, 1, 2, or 3.

The PHY 170 and link 172 store the node ID of the bridge 120 and constantly monitor the bus 14 traffic for a data packet containing the bridge 120 node ID. When a locally addressed transaction is received, the PHY 170 and link controller 172 store the packet of data into the receive FIFO of buffer RAM 194. The first quadlet of each packet contains a 4 bit transaction code (t code) that identifies the transaction type as write request, read request, response etc. The first quadlet also contains a 6 bit transaction label (t Label) that ties a response transaction to a given request transaction. A request packet will only contain one of the labels micro controller, auto sequencer ORB fetch, ATA sequencer page table fetch, and ATA sequencer data fetch.

Firmware generated interrupts are generated if the values in the two fields are not correct. One interrupt occurs if the transaction is received correctly and the tLabel field does not point to one of the auto-assist blocks. Another occurs if the tCode field does not identify the correct type of response for the specified auto-assist block. If the two fields are proper, a packet received interrupt is generated. The micro controller 180 responds to this interrupt by reading the receive FIFO contents using its access through the buffer manager 190. Subsequently, the micro controller 180 determines the course of action in response to the given packet and performs that action. If the transaction was a write or read response, the micro controller 180 stores the needed information from the packet and removes the packet from the receive FIFO. If the transaction was a valid request, the micro controller 180 updates or retrieves the corresponding register information and sends a response packet. The micro controller 180 sends packets by writing to the transit FIFO using its access through the buffer manager. The PHY 170 and link controller 172 monitor the transmit FIFO to determine if they should arbitrate for the bus and send a packet. When they win arbitration a packet is sent. After the packet is sent correctly and acknowledged by the receiving device, link controller 172 removes the packet from the transmit FIFO. If the packet is not acknowledged or a busy acknowledge is received, the transmission of the packet is retried until the retry count reaches a maximum. A micro controller interrupt is generated if the retry count reaches its maximum.

The auto sequencer 196 operates to speed up the transaction processing for some common sequences. It performs these transactions with very little overhead since it directly fills the transmit FIFO or empties the receive FIFO.

The SBP-2 protocol defines a generic data transfer protocol that allows quick mapping of many different upper level protocols, including SCSI, ATAPI and ATA to the 1394 bus protocol. SBP-2 uses operation request blocks or ORBs as the means for communicating a request to a target device. These requests include reads and writes to a data storage device such as a disk, tape or CD ROM. The ORB structure is designed to minimize the number of control and status registers (CSR) that must be maintained to support SBP-2. A basic ORB is a 32 byte block that follows some predetermined formats. The target is alerted that an ORB is ready to be processed by an initiator writing to some special CSR locations. The initiator tells the device the ORB location, the 1394 bus address of the ORB start point, and that the ORB is ready to be processed. The target then reads the ORB from the specified location and stores it in local memory. The ORB is decoded and the device performs the requested functions.

The initiator performs several writes for each ORB that is to be processed. To reduce the processing overhead, each ORB contains the next ORB address or an address to a null pointer if there is no following ORB. This allows generation of a linked list of ORBs. Some of the ORBs, called normal or CDB ORBs, pass command descriptor blocks (CDBs) to the target device. Other ORBs, which perform control related functions, are called management ORBs and have a different format than CDB ORBs. Different CSRs indicate the location and validity of the two types of ORBs.

Buffer manager 190 provides an interface to the buffer RAM 194 for the link controller 172, the auto sequencer 196, ATA sequencer 192 and micro controller interface 198. It provides 100 Mbyte per sec. bandwidth, segmented buffer space with bank 0, bank 1, a transmit FIFO, a receive FIFO and a special segment. It provides for a retry of a packet transmission in case of a busy or bad acknowledge and ignores the reception of a bad packet. It fills a packet for transmission prior to initiate sending that packet and provides a byte wide interface for micro controller 180. It provides for arbitrated access to the transmit and receive FIFOs for all block requests and arbitrated access to the buffer RAM for all block requests.

The auto sequencer 196 provides quick access into the transmit and receive FIFOs. This allows automation of the sequences to process a response to an ORB fetch and to arbitrate for the transmit FIFO and insert packet headers. When performing an ORB fetch, or any 32 byte or smaller block read request, the auto sequencer looks for a received response with a tLabel of 01xxxxb. The auto sequencer partitions the special segment into sixteen 32 byte fields. The lower 4 bits of the tLabel field in the received response indicate where in the sixteen 32 byte segments the block data are placed. The lower 4 bits become bits 6:3 of the quadlet address. When the response is received, the auto sequencer stores the 32 byte block date in the region of the special segment indicated but leaves the response header in the receive FIFO. When the micro controller 180 reads this header from the receive FIFO, it indicates the specified location containing the requested read information. This mechanism allows up to sixteen 32 byte (or smaller) block read requests to be outstanding at any one time.

The micro controller 180 requires sufficient time to build a packet header for transmission without locking the transmit FIFO from being used by other devices. To accomplish this, the auto sequencer contains a set of four quadlets that are firm ware programmable. These quadlets should contain the packet header for the packet that is to be transmitted. If block data is transmitted, an offset into either Bank 0, Bank 1 or the special segment can be indicated in the header. The micro controller 180 can then instruct the auto sequencer 196 to arbitrate for the transmit FIFO and store the header.

The ATA sequencer 192 provides an interface to an ATA device. The ATA sequencer has programmable PIO speeds for modes 0–4, has programmable DMA speeds for modes 0–2, is programmable to use either standard or Ultra DMA modes 0–2, provides automated ORB processing, provides automated status building and provides automated alternate access processing.

The ability of the data storage system 12 to accept concurrent read and write accesses to the same data storage device, e.g. DSD 110, from more than one host is implemented by allowing the corresponding bridge, e.g. bridge 120, to log in multiple host data processors from among the host data processors 20–26. Thereafter, when a data storage device access is received from a host data processor, the bridge searches the login data for a match between the requesting host and the stored log in information and the requested transaction is performed if the requesting host data processor has been logged in by the bridge and if no errors are found in the transmitted ORB packet.

The log in process begins when a log in management ORB is received from a requesting host data processing system by the PHY 170 and link controller 172. The link controller 172 checks the node ID, and the tLabel and tCode fields. If the node ID identifies the bridge, for example bridge 0 120, and there are no errors in the tLabel and tCode fields, the link controller places the ORB in the receive FIFO and generates an interrupt.

Figure 5A:
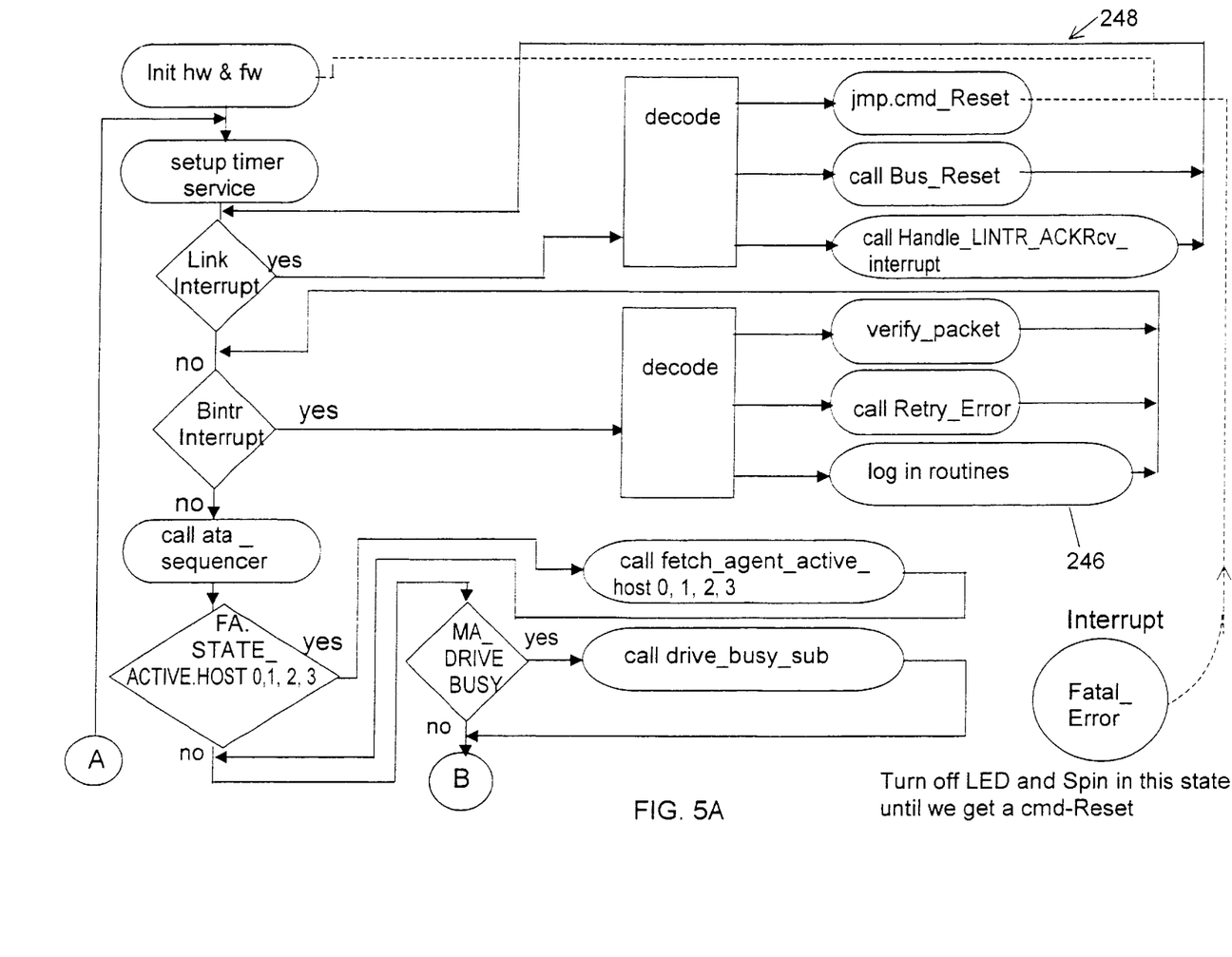
FIGS. 5A and 5B are an illustration of a flow chart for an executive routine for the data storage system shown in FIG. 1.
Figure 5B:
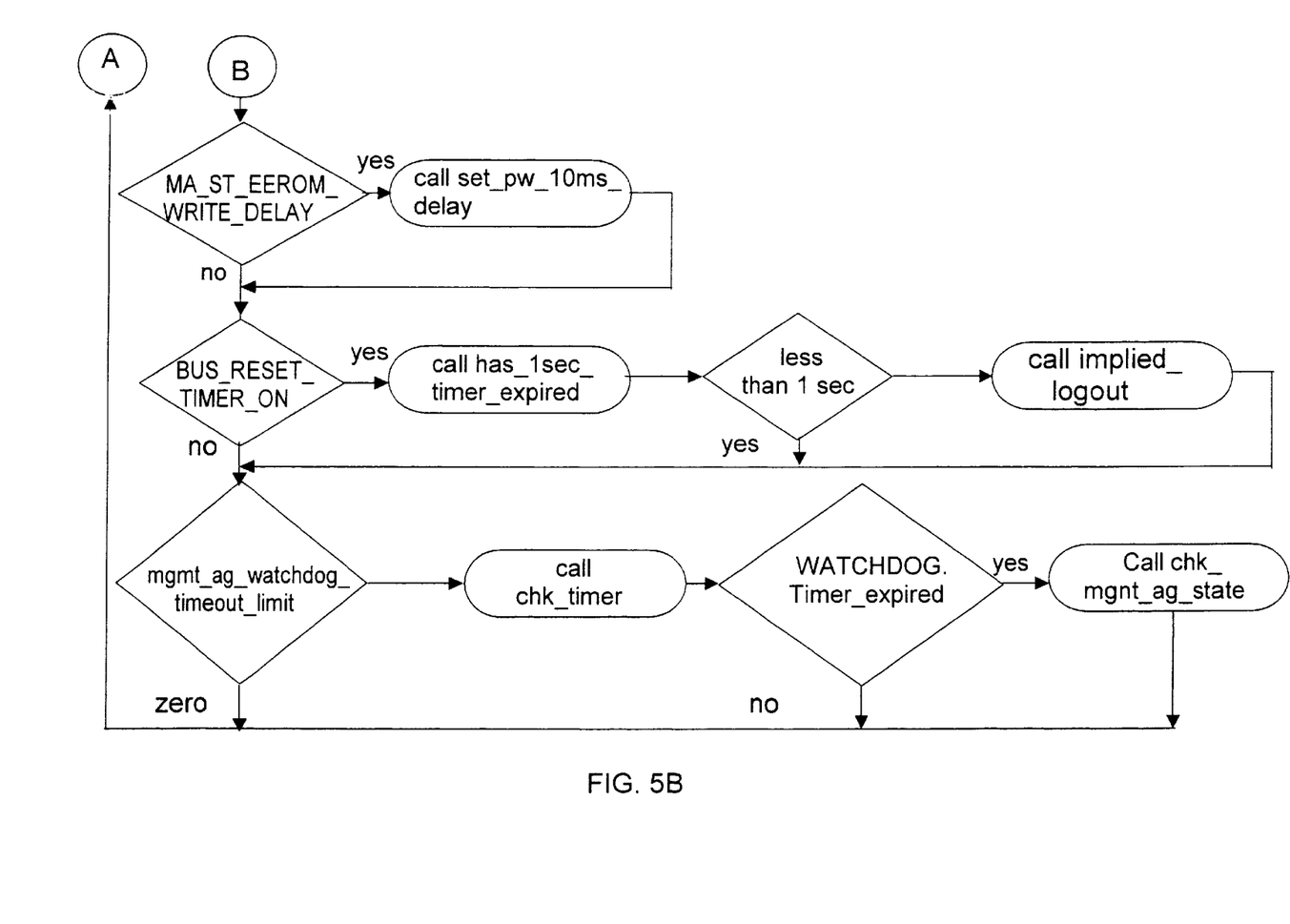
Figure 6:
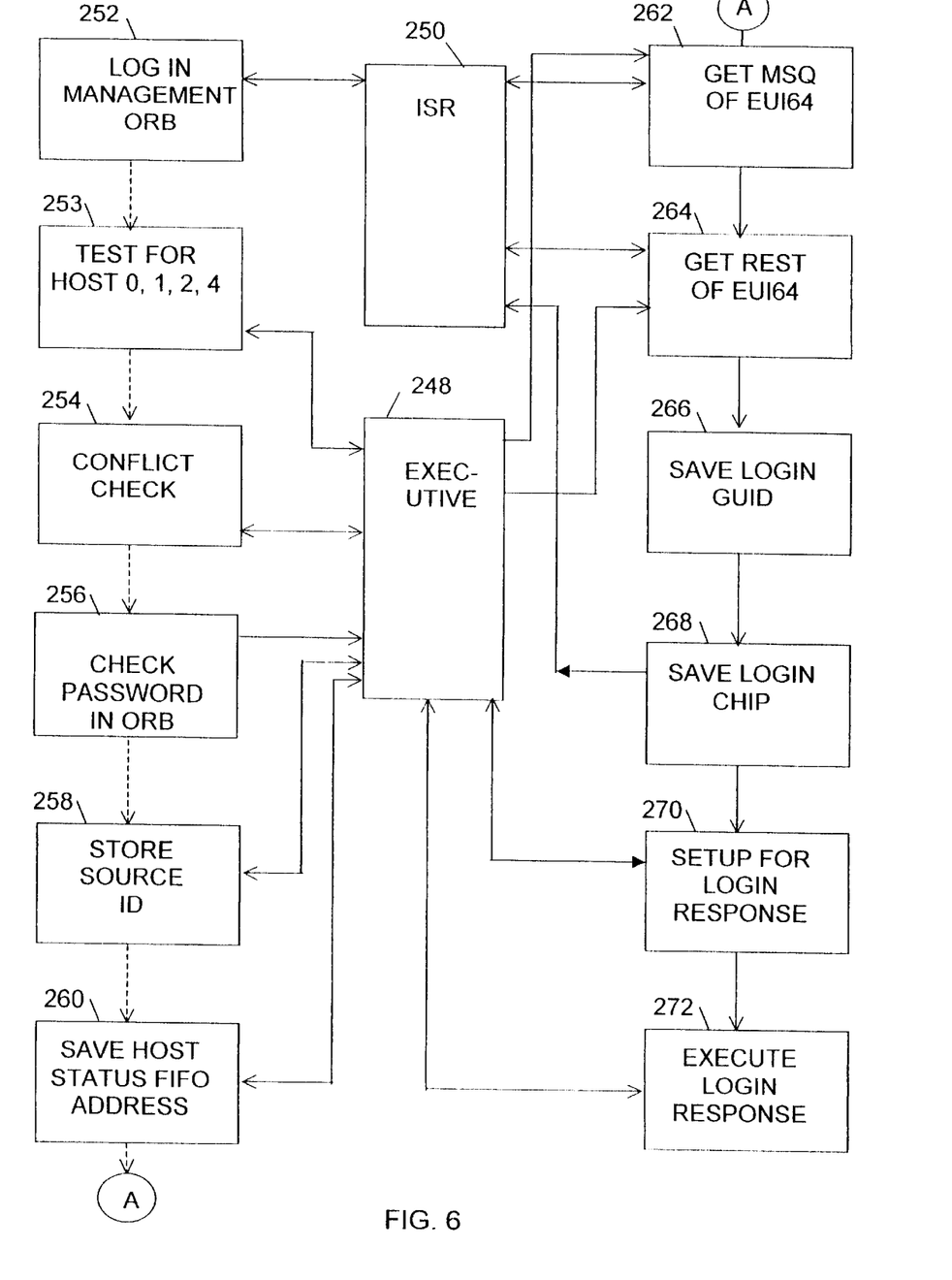
FIG. 6 is a flow chart illustrating a routine for processing a log in request that is used in the data storage system shown in FIG. 1.

Referring now to FIGS. 5A, 5B, and 6, high level control of micro controller 180 is provided by an executive routine 248, which monitors control and status registers at login routines act 246 and calls lower level routines to perform required functions in response to the data contents of the control and status register. Time critical operations, such as responding to the placement of a received data packet in the receive FIFO are initiated by an interrupt service routine (ISR) 250. The interrupt service routine250 examines the ORB in the FIFO to determine that the ORB is requesting a log in. It then calls a log in management ORB routine (login:) 252 ,that confirms that an ORB packet has been received and stores the ORB packet in RAM 168 for further validation. Control and status register bits are set to indicate the outcome of the operation.

The executive 248 then responds to control and status bits indicating a successful operation by calling a routine (login_LUNO-4) 253 that checks for errors in the various data fields of the ORB and in particular checks to make sure that the ORB specifies a valid logical unit. In the present example, LUN refers to a log in host and up to 4 hosts are acceptable, HOST0, HOST1, HOST2 and HOST3. If no errors are found, the ORB is removed from the receive FIFO and temporarily stored in RAM 164 and a control and status register bit is set to implement further processing of the ORB data. If an error is found, a control and status register bit is set to indicate the error for further processing and the ORB is removed from the FIFO receive buffer. The routine for host testing 253 is then exited.

In the absence of further interrupts, the executive routine 248 examines control and status registers until it finds the bit that was set by the host checking routine 253. This bit causes executive routine 248 to call a conflict check routine (login_LUN0:, login_LUN1:, login_3:) 254. The conflict check routine checks to be sure that the new log in request plus completed log ins plus any log in that is in progress does not exceed the maximum of 4 concurrent log ins. The check routine also checks to be sure that the same host is not trying to log in a second time while already logged in (login_3). In one alternative embodiment, the check procedure is simplified by not allowing a new host to log in until any prior log in request has been completely processed. Control and status register bits are set to indicate the outcome of the check and control is returned to the executive routine 248.

Subsequently, the executive routine 248 finds the control and status register set that indicates a successful conflict check and it then calls a check password routine (login_password_indirect:) 256 that compares the ORB password to the password stored in the configuration ROM 16. Again, a control and status register bit is set to indicate whether the password check passed or failed. Control is returned to the executive routine 248.

In the event that the control and status register indicate that the ORB passed the check password test at routine 256, the executive routine 248 calls a store source ID routine login_ok:, login_src_id:) 258 that stores the requesting host ID in a table in RAM 168 for later use. A separate table is maintained for each of the possible 4 hosts that may be logged in at one time. A status and control bit is set to indicate completion of this operation and control returns to executive routine 248.

In the event that the control and status register indicate that the host source ID was successfully stored by routine 258, a store host status FIFO address routine (login_status_fifo) 260 is called by executive routine 248 to set up a host status block in RAM 168 and store the address of the host status block in RAM 168. The routine 260 sets appropriate bits in control and status registers to indicate success or failure and exits to the executive routine 248.

Upon detecting the successful completion of routine 260, executive routine 248 calls a get MSQ routine (get_host_EUI64:) 262 which sends a write packet to the host to request the upper quad of the host 64 bit extended unique identification. Upon receipt of the return packet, link 172 stores the packet in the receive FIFO and generates an interrupt to inform the processor 180 of its arrival. ISR 250 then calls routine 262 to receive the packet and store the upper quad of the EUI64. Routine 262 sets control and status bits to indicate successful or unsuccessful completion and exits to ISR 250.

Upon detecting the successful completion of routine 262, executive routine 248 calls a get REST routine (login_guid_rest::) 264 which sends a write packet to the host to request the rest of the host 64 bit extended unique identification. Upon receipt of the return packet, link 172 stores the packet in the receive FIFO and generates an interrupt to inform the processor 180 of its arrival. ISR 250 then calls routine 264 to receive the packet and store the remainder of the EUI64. Routine 264 sets control and status bits to indicate successful or unsuccessful completion and exits to ISR 250.

Upon successful completion of routine 264, the ISR 250 calls a save login GUID routine (save_guid:) 266 which saves the user ID found in the lower quadlet of the EUI64 returned by the host data processing system. The routine 264 sets control bits indicating success or failure and exits to the ISR 250.

Upon successful completion of routine 266, the ISR 250 calls a save login chip routine (login_chip_resp:) 268 which saves the upper quad of the EUI64 data from the host. The routine 268 then sets control and status bits indicating success or failure and exits to the ISR 250, which further exits, allowing executive 248 to resume control of micro controller 180.

In response to the previously set control and status bits, executive 248 call set up for login response routine (lgoin_4b:) 270 which retrieves the source ID of the ORB for the host requesting log in and sets up the response packet indicating a successful log in. Routine 270 sets control and status bits indicating success or failure and exits to the executive 248.

Executive 248 then responds to the control and status register contents to call a login response done routine 272 which sends the requesting host an appropriate response packet indicating success or failure of the requested log in and exits to the executive 248.

As used in this specification, the word "or" is intended to mean an inclusive or covering either alternative or both alternatives unless the context explicitly indicates otherwise.

In the following claims, it is intended that a claim element be interpreted as a means plus function or step plus function claim element that is to be interpreted to cover the corresponding structure, material or acts described in the specification and equivalents thereof as specified by 35 USC § 112, paragraph 6, when and only when, the claim element recites the express language "means for" or "step" for performing a function.

While there has been shown and described a data processing system having a data storage system for the purpose of enabling a person of ordinary skill in the art to make and use the invention, it will be appreciated that the invention is not limited thereto. For example, specific features or circuits may be disclosed as implemented in a preferred or alternative embodiment of the invention. However, the disclosure of a specific feature or circuit does not mean that the feature or circuit is required for all implementations of the invention or that an alternative feature or circuit could not be used in place of the disclosed feature or circuit. The embodiment or embodiments described herein are intended to exemplify, but not limit the claimed invention. The subject matter which applicants regards as the invention is defined by the attached claims. Accordingly, any modifications variations or equivalent arrangements within the scope of the attached claims should be considered to be within the scope of the invention.

What is claimed is:

1. A data storage system comprising:
    an interface that is connectable via a data bus system to a plurality of host data processing systems;
    at least one data storage device providing at least one storage volume for writing and retrieving data; and
    at least one bridge, each bridge being coupled to an associated one of the at least one data storage device and to the interface, each bridge establishing login connections with a plurality of the host data processing systems and simultaneously maintaining login connections with a plurality of the host data processing systems, each login connection associating a storage volume with a host data processing system, and each bridge making data accesses in response to access request information received from a host data processing system having an established login connection, the data accesses being made to a storage volume associated with the host data processing system by the established login connection that is maintained by the bridge.

2. A data storage system according to claim 1, wherein the at least one data storage device includes at least two data storage devices, each of which is a hard disk drive.

3. A data storage system according to claim 1, wherein the interface is connectable by an IEEE 1394a type of bus system to a plurality of host data processing systems.

4. A data storage system according to claim 3, wherein the IEEE 1394a type of bus system is a FireWire type of bus system.

5. A data storage system according to claim 1, wherein each login connection is established by storing a different block of login information corresponding to a logged in data processing system for each data processing system that is logged in, the block of login information identifying the corresponding logged in data processing system and being assembled and stored in response to information received from the corresponding data processing system.

6. A data storage system according to claim 1, wherein the interface is connectable by a Firewire type of bus system to the plurality of host data processing systems.

7. A data storage system according to claim 1, wherein the interface is connectable by separate point to point serial buses to each of the plurality of host data processing systems.

8. A data storage system according to claim 1, wherein the interface is connectable by a different serial bus to each host data processing system of the plurality of host data processing systems.

9. A data storage system that is coupled to communicate with a plurality of host data processing systems over a data bus system, the data storage system comprising:
    at least one data storage device; and
    at least one bridge, each bridge being coupled to an associated one of the at least one data storage device and to the interface, each bridge establishing login connections with a plurality of the host data processing systems in response to information received from each host data processing system in the plurality of host data processing systems and simultaneously maintaining login connections with each data processing system in the plurality of host data processing systems with each login connection maintaining an association between the associated data storage device and a host data processing system, and each bridge making data accesses to the associated data storage device in response to access request information received from each of the host data processing systems for which a login connection is being maintained.

10. A data storage system according to claim 9, wherein the at least one data storage device includes at least two data storage devices, each of which is a hard disk drive.

11. A data storage system according to claim 9, wherein the interface is connectable by an IEEE 1394a type of bus system to a plurality of host data processing systems.

12. A data storage system according to claim 11, wherein the IEEE 1394a type of bus system is a FireWire type of bus system.

13. A data storage system according to claim 9, wherein the interface is connectable by a different serial bus to each host data processing system of the plurality of host data processing systems.

14. A data storage system according to claim 9, wherein the interface is connectable by a serial bus system to the plurality of host data processing systems.

15. A data storage system according to claim 9, wherein the interface is separately connected by a different serial bus to each host data processing system of the plurality of host data processing systems.

16. A data storage system according to claim 9, wherein the interface is separately connected by a different point to point serial bus to each host data processing system of the plurality of host data processing systems.

17. A data storage system comprising:
an interface that is connectable via a data bus system to a plurality of host data processing systems;
at least one disk drive; and
at least one bridge, each bridge being coupled to an associated one of the at least one disk drive and to the interface, each bridge establishing login connections with a plurality of the host data processing systems that establish an association between the associated disk drive and an associated host data processing system and simultaneously maintaining login connections with a plurality of the host data processing systems, and each bridge making data accesses to the associated disk drive only in response to access request information received from a host data processing system having an established login connection.

18. A data storage system according to claim 17, wherein the at least one disk drive includes at least six disk drives.

19. A data storage system according to claim 17, wherein the interface is connectable by an IEEE 1394a type of bus system to a plurality of host data processing systems.

20. A data storage system according to claim 19, wherein the IEEE 1394a type of bus system is a FireWire type of bus system.

21. A data storage system according to claim 17, wherein each login connection is established by storing a different block of login information corresponding to a logged in data processing system for each data processing system that is logged in, the block of login information identifying the corresponding logged in data processing system and being assembled and stored in response to information received from the corresponding data processing system.

22. A data storage system according to claim 17, wherein the data accesses include read data accesses and write data accesses.

23. A data storage system according to claim 17, wherein the interface is connectable by a serial bus system to the plurality of host data processing systems.

24. A data storage system according to claim 17, wherein the interface is separately connected by a different serial bus to each host data processing system of the plurality of host data processing systems.

25. A data storage system according to claim 17, wherein the interface is separately connected by a different point to point serial bus to each host data processing system of the plurality of host data processing systems.

26. A data storage system according to claim 21, wherein the interface is connectable by a serial bus system to the plurality of host data processing systems.

27. A data storage system according to claim 21, wherein the interface is separately connected by a different serial bus to each host data processing system of the plurality of host data processing systems.

28. A data storage system according to claim 21, wherein the interface is separately connected by a different point to point serial bus to each host data processing system of the plurality of host data processing systems.

29. A data storage system that is coupled to communicate with a plurality of host data processing systems over a data bus system, the data storage system comprising:
at least one disk drive data storage device; and
at least one bridge, each bridge being coupled to an associated one of the at least one disk drive data storage device and to the interface, each bridge establishing login connections with a plurality of the host data processing systems in response to information received from each host data processing system in the plurality of host data processing systems and simultaneously maintaining login connections with each data processing system in the plurality of host data processing systems, and each bridge making data accesses to the associated disk drive data storage device in response to access request information received from each of the host data processing systems for which a login connection is being maintained.

30. A data storage system according to claim 29, wherein the at least one data disk drive storage device includes at least two disk drive data storage devices, each of which is a hard disk drive.

31. A data storage system according to claim 29, wherein the interface is connectable by an IEEE 1394a type of bus system to a plurality of host data processing systems.

32. A data storage system according to claim 31, wherein the IEEE 1394a type of bus system is a FireWire type of bus system.

33. A data storage system storing data for a plurality of host data processing systems, the data storage system comprising:
a plurality of disk drives storing data;
a plurality of bridges, each coupled to a different one of the disk drives and each coupled for communication with the plurality of host data processing systems, each bridge establishing and simultaneously maintaining login connections with a plurality of host data processing systems and providing data access with the coupled disk drive in response to information received from a logged in host data processing system.

34. A data storage system according to claim 33, wherein the plurality of bridges each store later requests for data access that are received from a logged in host data processing system while a prior request for data access by a logged in host data processing system is still being processed in a queue and respond to the stored later requests for data access after the prior request for data access has been processed.

35. A data storage system according to claim 34, wherein the data storage system communicates with the host data processing system over an IEEE 1394a type of bus system and further comprising an interface coupling the plurality of bridges to the bus system.

36. A data storage system according to claim 33, wherein the interface is connectable by a serial bus system to the plurality of host data processing systems.

37. A data storage system according to claim 33, wherein the interface is separately connected by a different serial bus to each host data processing system of the plurality of host data processing systems.

38. A data storage system according to claim 33, wherein the interface is separately connected by a different point to point serial bus to each host data processing system of the plurality of host data processing systems.

39. A data storage system comprising:

an interface;

a data bus system connecting the interface to a plurality of host data processing systems, the data bus system having a separate point to point serial data bus extending between the interface and each different host data processing system;

at least one data storage device; and a controller coupled to the interface and to the at least one data storage device, at least one bridge, each bridge being coupled to an associated one of the at least one data storage device and to the interface, each bridge establishing login connections with a plurality of the host data processing systems and simultaneously maintaining login connections with a plurality of the host data processing systems, and each bridge making data accesses to the associated data storage device in response to access request information received from a plurality of host data processing system.

40. A data storage system comprising:

a plurality of host data processing systems;

a data bus system connecting the interface to a plurality of host data processing systems, the data bus system having a separate point to point serial data bus extending between the interface and each different host data processing system;

at least one data storage device;

a controller coupled to the interface and to the at least one data storage device; and at least one bridge, each bridge being coupled to an associated one of the at least one data storage device and to the interface, each bridge establishing login connections with a plurality of the host data processing systems and simultaneously maintaining login connections with a plurality of the host data processing systems, and each bridge making data accesses to the associated data storage device in response to access request information received from a plurality of host data processing system.

41. A data storage system comprising:

a plurality of host data processing systems;

a plurality of data storage devices;

a controller coupled to each of the data storage devices and to each of the host data processing systems, the controller controlling a transfer of data between the data storage devices and the host data processing systems in response to information received from the host data processing systems, the received data including login requests establishing login connections identifying a data storage device and a host data processing system and with data transfers occurring only between data storage devices and host data processing systems identified by an established login connection; and a plurality of FireWire type of serial data buses, each serial data bus providing data communication between the controller and a different one of the plurality of host data processing systems.

* * * * *